Patented June 3, 1930

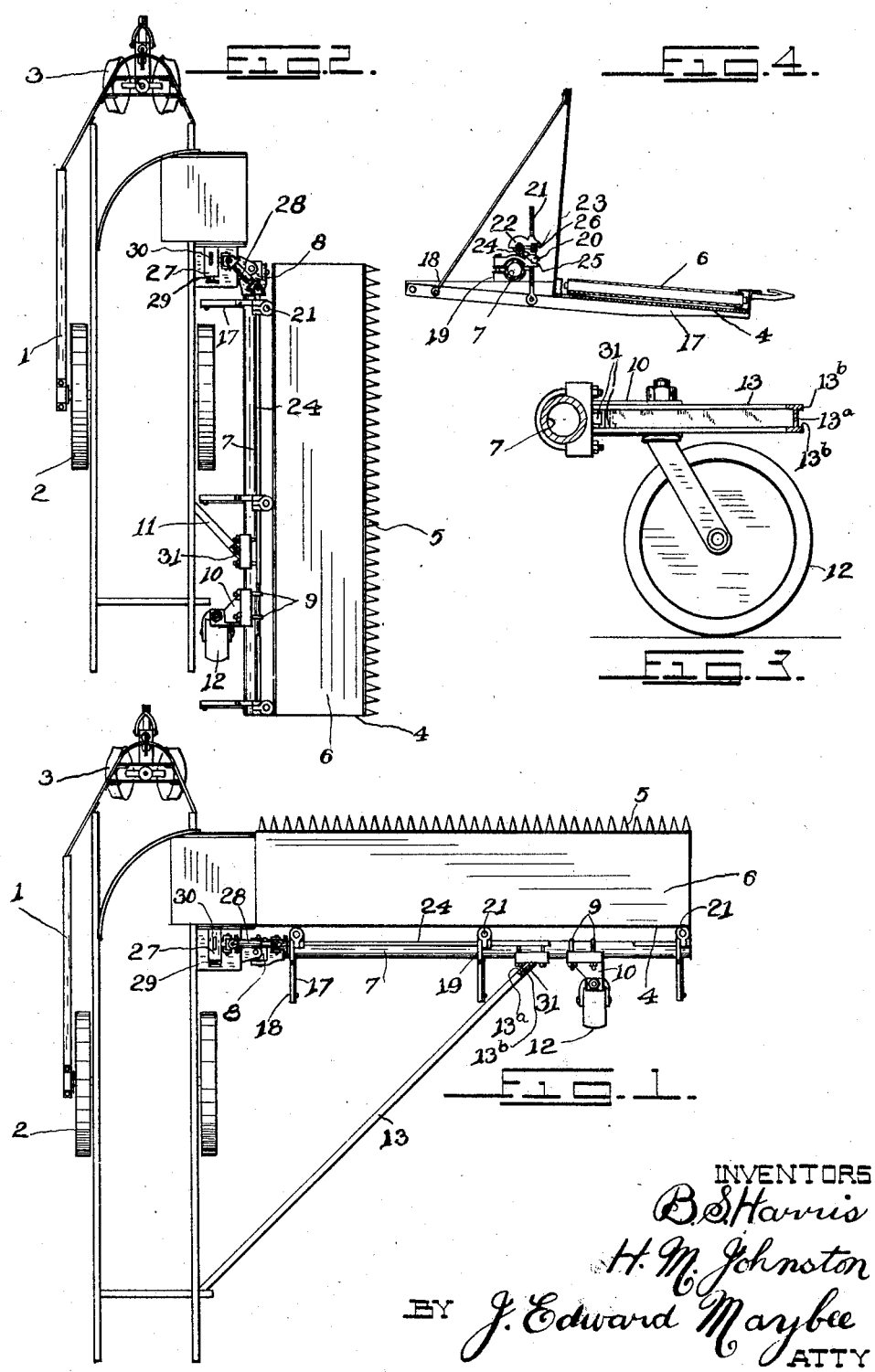

1,761,265

UNITED STATES PATENT OFFICE

BURTON S. HARRIS AND HOWARD M. JOHNSTON, OF TORONTO, ONTARIO, CANADA, ASSIGNORS TO MASSEY-HARRIS COMPANY, OF TORONTO, CANADA

REAPER THRASHER

Application filed August 26, 1927. Serial No. 215,562.

This invention relates to implements adapted to cut grain and thrash it in the field, which employ cutting means, conveying means and thrashing means driven usually by an internal combustion engine carried by the machine. The cutting means and part of the conveying means are carried by a header platform and the object of the present invention is to so carry this header platform that the machine may be readily transported through ordinary sized gate-ways and along roads of standard widths.

We attain our object by pivotally mounting the header platform, which normally extends laterally of the main frame of the machine, so that it may be swung inwardly against the side of the main frame. This swinging movement is facilitated by the use of a caster wheel which supports the outer end of the platform.

The constructions are hereinafter more fully described and are illustrated in the accompanying drawings in which Fig. 1 is a plan view of part of a reaper-thrasher showing the header platform in its operative position;

Fig. 2 a view similar to Fig. 1 showing the header platform in its inoperative position;

Fig. 3 a cross sectional detail of the bar for supporting the header platform showing the connection therewith of the brace for bracing the platform in its operative position; and Fig. 4 a cross sectional detail of the supporting bar and the header platform.

In the drawings like numerals of reference indicate corresponding parts in the different figures.

1 is a part of the main frame of the machine which is supported by the ground wheels 2 and the wheels of the fore-carriage 3. This frame supports various parts of the machine (not herein referred to nor described as they form no part of the present invention).

The header platform 4 carrying the cutter bar 5 and the conveyor 6, which are of ordinary type and operated in any ordinary manner, is carried in the following manner:

A supporting bar 7 is connected, as hereinafter described, with the main frame and extends behind the header platform. The outer end of the bar 7 is supported by means of a caster wheel 12 journalled in a bracket 10 secured by means of U bolts 9 to the bar 7. The header platform is supported from the bar 7 in any suitable manner so that it may be adjusted relative to the ground and so that it may lift independently of the adjusting means. This may be accomplished by providing the header platform with rearwardly extending supporting members 17, the rear ends of which are pivotally connected with the rearward ends of fulcrum members 18 which are secured by means of clamps 19 to the supporting bar 7. Each clamp 19 is provided with a saddle 20 through which freely passes the supporting rod 21 pivotally connected at its lower end to the adjacent supporting member 17. These supporting rods are threaded as shown. Each supporting rod passes through a bearing 22 in which is rotatably mounted a nut 23, through which the supporting rod is threaded. It is evident that by rotating the nuts 23 that the supporting members 17 may be moved up and down and the position of the header platform relative to the ground thus adjusted. In order that these nuts may be simultaneously operated, a shaft 24 is journaled in the bearings 22, and this shaft is provided with helical gears 25 meshing with helical gears 26 formed on the nuts 23.

It will be noted as the bearings 22 rest on the saddles 20 and are in no wise secured thereto that any upward movement of the header platform, such as may occur when it strikes an obstruction, will cause the bearings 22 to be lifted from the saddles. We have thus provided means whereby the header platform may automatically lift independent of the adjustment of the nuts 23.

In view of the fact that the shaft 24 must be operated from the main frame, provision must be made to permit of the rise and fall of the shaft. To drive the shaft we therefore provide a gear box 27 on the main frame. The shaft is driven from this gear box through the medium of the universal jointed telescopic shaft 28 of known type. The drive shaft 29 of the gear box may be actuated in any convenient manner from the power plant of the machine. The gear box includes reverse gear mechanism operable through the medium of a hand lever 30. The specific constructions of the reverse gears being immaterial, such constructions are not shown.

Heretofore it has been the usual practice to secure the header platform 4 permanently on the main frame 1, as this platform is of considerable length, the total width of the machine with the platform in its operative position, in which it extends substantially at right angles to the main frame, is such that the machine cannot be moved into and out of fenced fields having gate-ways of usual widths nor can it be transported along highways or roads of standard widths. To overcome these difficulties we carry the header platform so that it may be swung into and out of its operative position whereby the total width of the machine, when desired can be easily and readily reduced to a minimum for transportation purposes. This is accomplished by hinging one end of the supporting bar 7 on the main frame 1, the hinge connection being preferably in the form of a universal joint 8. To hold the header platform in its operative position we provide a diagonal brace 13 having one end detachably secured in any suitable manner to the main frame. The other end of this brace which is preferably an I beam, is adapted to be received in a pocket formed by spaced lugs 31 carried by the bar 7. These lugs are spaced apart sufficiently to snugly receive the web 13$^a$ of the I beam brace 13 and the flanges 13$^b$ thereof engage the upper and lower faces of the lugs to prevent the vertical displacement of the brace.

By removing the brace and disconnecting the telescopic shaft 28, the header platform may be swung around on the caster wheel with the vertical pin of the universal joint 8 as the pivot to the inoperative position as shown in Fig. 2. In this position the bar 7, and thus the header platform, is substantially parallel to the main frame. Any suitable device such as a latch or bar 11 may be employed for engagement with the lugs 31 to releasably lock the header platform in its inoperative position.

What we claim is:

1. In a harvester, the combination of a main frame; a header platform; a header platform supporting bar pivoted on the main frame whereby the platform may be swung from an operative to an inoperative position and vice versa; a caster wheel for supporting the outer end of the supporting bar; a diagonal brace having one end secured to the main frame for bracing the platform in its operative position; spaced lugs carried by the bar for forming a pocket adapted to receive the other end of the brace when the platform is in its operative position; and a lock bar carried by the main frame adapted to be received in the said pocket to releasably retain the header platform in its inoperative position.

2. In a harvester, the combination of a main frame; a header platform; a header platform supporting bar pivoted on the main frame whereby the platform may be swung from an operative to an inoperative position and vice versa; a caster wheel for supporting the outer end of the supporting bar; a diagonal I beam having one end secured to the main frame for bracing the platform in its operative position; a lock bar carried by the main frame; and a pair of lugs carried by the said header platform supporting bar, the lugs being spaced apart to receive the web of the I beam when the platform is in its operative position and to receive the lock bar when the platform is in its inoperative position.

Signed at Toronto, Canada, this 15th day of July, 1927.

BURTON S. HARRIS.
HOWARD M. JOHNSTON.